(12) United States Patent
Leer et al.

(10) Patent No.: US 8,104,509 B2
(45) Date of Patent: Jan. 31, 2012

(54) WATER TIMER SYSTEM HAVING REMOVABLE INPUT AND DISPLAY MODULE

(75) Inventors: Rick L. Leer, Somerset, PA (US); William F. Zore, Friedens, PA (US)

(73) Assignee: Robert Bosch GmbH, Stuttgart (DE)

( * ) Notice: Subject to any disclaimer, the term of this patent is extended or adjusted under 35 U.S.C. 154(b) by 427 days.

(21) Appl. No.: 12/346,466

(22) Filed: Dec. 30, 2008

(65) Prior Publication Data

US 2010/0163126 A1   Jul. 1, 2010

(51) Int. Cl.
*F17D 3/00* (2006.01)
(52) U.S. Cl. ............... 137/624.11; 137/552.7; 239/70
(58) Field of Classification Search ............. 137/624.11, 137/624.12, 552.7; 239/69, 70
See application file for complete search history.

(56) References Cited

U.S. PATENT DOCUMENTS

| | | | |
|---|---|---|---|
| 4,592,505 A | 6/1986 | Bruninga et al. | |
| 4,633,905 A | 1/1987 | Wang | |
| D299,516 S | 1/1989 | Wang | |
| 4,797,820 A | 1/1989 | Wilson et al. | |
| 4,807,664 A | 2/1989 | Wilson et al. | |
| 5,135,168 A * | 8/1992 | Wang | 239/70 |
| D365,771 S | 1/1996 | Clivio | |
| 5,715,866 A * | 2/1998 | Granger | 137/624.11 |
| 5,826,619 A * | 10/1998 | Roman | 239/69 |
| D430,044 S | 8/2000 | Clivio | |
| 6,337,635 B1 | 1/2002 | Ericksen et al. | |
| D467,187 S | 12/2002 | Clivio | |
| D485,502 S | 1/2004 | Clivio | |
| 6,719,010 B1 | 4/2004 | Yi-Chang | |
| D559,708 S | 1/2008 | Michael et al. | |
| D567,681 S | 4/2008 | Michael et al. | |
| 7,574,285 B2 * | 8/2009 | Kah, Jr. | 137/624.11 |

* cited by examiner

*Primary Examiner* — Kevin Lee
(74) *Attorney, Agent, or Firm* — Maginot, Moore & Beck

(57) ABSTRACT

A water timer system includes a base assembly and an input and display module. The base assembly includes (i) a conduit structure defining an inlet, an outlet, and a passage extending therebetween, (ii) a first housing defining a first chamber, (iii) a motor located within the first chamber and having an output member, (iv) a gear set located within the first chamber, (v) a valve member movable between a first valve position in which the valve member is positioned to prevent water flow through the passage and a second valve position in which the valve member is positioned to enable water flow through the passage, wherein movement of the gear set causes the valve member to move between the first valve position and the second valve position, and (vi) a receptacle structure defining a first aperture and a second aperture.

21 Claims, 13 Drawing Sheets

WATER TIMER SYSTEM HAVING REMOVABLE INPUT AND DISPLAY MODULE

CROSS REFERENCE

Cross reference is made to U.S. patent application Ser. No. 29/330,182 (now U.S. Pat. No. D604,189), entitled "Front Face of an Electronic Water Timer" by Rick L. Leer and William F. Zore; Ser. No. 29/330,183 (now U.S. Pat. No. D604,190), entitled "Front Face of an Electronic Water Timer" by Rick L. Leer and William F. Zore; and Ser. No. 29/330,187 (now U.S. Pat. No. D604,184), entitled "Water Timer" by Rick L. Leer and William F. Zore, all of which are assigned to the same assignee of the present invention, and all of which are filed on the same date herewith. All of the above-identified patent applications are herein incorporated by reference in their entirety.

BACKGROUND

The present disclosure relates generally to a water timer system, and more particularly to a water timer system having a removable input and display module.

It is common for home owners to use lawn sprinklers to water outdoor vegetation such as flowers, trees, lawns, and shrubs on a regular basis. To this end, a flexible hose having an end with an internally threaded coupling is secured to an externally threaded hose bib located on the outside of a house. The other end of the flexible hose possesses a male threaded coupling which is attached to a complementary coupling of a lawn sprinkler. In order to water the desired vegetation, the valve of the hose bib must be opened in order to allow water to flow through the hose bib, the hose, and the lawn sprinkler. After the hose bib is actuated so as to allow water to flow therethrough, the home owner typically turns his or her attention to other household tasks. In is not uncommon for an owner to forget to turn off the water at the house bib after a desired amount of time. Thus, excess water is applied to the vegetation endangering the life of the vegetation as well as wasting a significant amount of water which can be very costly.

In order to address this problem, automatic water timer systems have been developed that can be connected to hose bibs and include built in valves which are operated by a timer apparatus in order to open and close its valve at predetermined times thereby enabling watering of vegetation during a preselected time interval. One difficulty with some of these water timer systems is that a home owner must program the water timer system at the location of the hose bib. This can be uncomfortable since the hose bibs are typically positioned well below the eye level of a person. Other of these water timer systems have a removable input and display module to allow remote programming of the water timer system in an environment more comfortable to a home owner such a chair inside the owner's house.

These latter types of water timer systems tend to possess designs that have significant drawbacks. For example, certain of these water timer systems have input and display modules that are bulky and cumbersome to handle. Other of these water timer systems are not constructed to withstand the outdoor elements such rain. Still others are complicated to manufacture.

What is needed therefore is an improved water timer system. What is further needed is a water timer system that has an input and display unit that is not bulky or cumbersome to handle. What is also needed is a water timer system that is constructed to withstand the outdoor elements for a long period of time. In addition, what is needed is a water timer system that is relatively easy to manufacture.

SUMMARY

In accordance with one embodiment of the present disclosure, there is disclosed a water timer system that includes a base assembly and an input and display module. The a base assembly includes (i) a conduit structure defining an inlet, an outlet, and a passage extending between the inlet and the outlet, (ii) a first housing defining a first chamber, (iii) a motor located within the first chamber and having an output member, (iv) a gear set located within the first chamber, wherein movement of the output member causes movement of the gear set, (v) a valve member movable between a first valve position in which the valve member is positioned to prevent water flow through the passage and a second valve position in which the valve member is positioned to enable water flow through the passage, wherein movement of the gear set causes the valve member to move between the first valve position and the second valve position, (vi) receptacle structure defining a first aperture and a second aperture. The input and display module includes (i) a second housing defining a second chamber and a third chamber, (ii) timer circuitry located within the second chamber, (iii) an input and display device configured to provide input signals to the timer circuitry in response to user actuation and to display indicia relating to an operating state of the water timer system, (iv) electrical terminals located in the third chamber and electrically connected to the timer circuitry, (v) a first projection extending from the second housing and configured to be received within the first aperture of the receptacle structure, and (vi) a second projection extending from the second housing and configured to be received within the second aperture of the receptacle structure. The third chamber is at least partially positioned between the first projection and the second projection. The input and display module is positionable in relation to the base assembly between (i) a first module position in which the input and display module is supported by the base assembly, and (ii) a second module position in which the input and display module is spaced apart from the base assembly. When the input and display module is positioned in the first module position, (i) the first projection of the input and display module is received within the first aperture of the receptacle structure, and (ii) the second projection of the input and display module is received within the second aperture of the receptacle structure. When the input and display module is positioned in the second module position, (i) the first projection of the input and display module is spaced apart from the first aperture of the receptacle structure, and (ii) the second projection of the input and display module is spaced apart from the second aperture of the receptacle structure.

Pursuant to another embodiment of the present disclosure, there is disclosed a water timer system that includes a base assembly and an input and display module. The base assembly includes (i) a conduit structure defining an inlet, an outlet, and a passage extending between the inlet and the outlet, (ii) a first housing defining a first chamber, (iii) a motor located within the first chamber and having an output member, (iv) a valve member movable between a first valve position in which the valve member is positioned to prevent water flow through the passage and a second valve position in which the valve member is positioned to enable water flow through the passage, wherein movement of the motor causes the valve member to move between the first valve position and the second valve position, (v) one of a first aperture and a first projection, and (vi) one of a second aperture and a second projection. The input and display module includes (i) a second housing defining a second chamber and a third chamber, (ii) timer circuitry located within the second chamber, (iii) an input and display device configured to provide input signals to the timer circuitry in response to user actuation and to display indicia relating to an operating state of the water timer system, (iv) electrical terminals located in the third chamber and electrically connected to the timer circuitry, (v) the other of the first aperture and the first projection, and (vi) the other of the second aperture and the second projection. The input and display module is positionable in relation to the base assembly between (i) a first module position in which the input and display module is supported by the base assembly, and (ii) a second module position in which the input and display module is spaced apart from the base assembly. When the input and display module is positioned in the first module position, (i) the first projection is received within the first aperture, and (ii) the second projection is received within the second aperture. When the input and display module is positioned in the second module position, (i) the first projection is spaced apart from the first aperture, and (ii) the second projection is spaced apart from the second aperture. When the input and display module is positioned in the first module position, (i) the third chamber is at least partially positioned between the first projection and the second projection, and (ii) the third chamber is at least partially positioned within the first chamber. The input and display module is positioned in the second module position, the third chamber is spaced apart from the first chamber.

In accordance with yet another embodiment of the present disclosure, there is disclosed a water timer system that includes a base assembly and a input and display module. The base assembly includes (i) a conduit structure defining an inlet, an outlet, and a passage extending between the inlet and the outlet, (ii) a first housing defining a first chamber, (iii) a motor located within the first chamber and having an output member, (iv) a valve member movable between a first valve position in which the valve member is positioned to prevent water flow through the passage and a second valve position in which the valve member is positioned to enable water flow through the passage, wherein movement of the motor causes the valve member to move between the first valve position and the second valve position, (v) one of a first aperture and a first projection, and (vi) one of a second aperture and a second projection. The input and display module includes (i) a second housing defining a second chamber and a third chamber, (ii) timer circuitry located within the second chamber, (iii) an input and display device configured to provide input signals to the timer circuitry in response to user actuation and to display indicia relating to an operating state of the water timer system, (iv) electrical terminals located in the third chamber and electrically connected to the timer circuitry, (v) the other of the first aperture and the first projection, and (vi) the other of the second aperture and the second projection. The input and display module is positionable in relation to the base assembly between (i) a first module position in which the input and display module is supported by the base assembly, and (ii) a second module position in which the input and display module is spaced apart from the base assembly. When the input and display module is positioned in the first module position, (i) the first projection is received within the first aperture, and (ii) the second projection is received within the second aperture. When the input and display module is positioned in the second module position, (i) the first projection is spaced apart from the first aperture, and (ii) the second projection is spaced apart from the second aperture.

DESCRIPTION OF THE PREFERRED EMBODIMENTS

Figure 1:
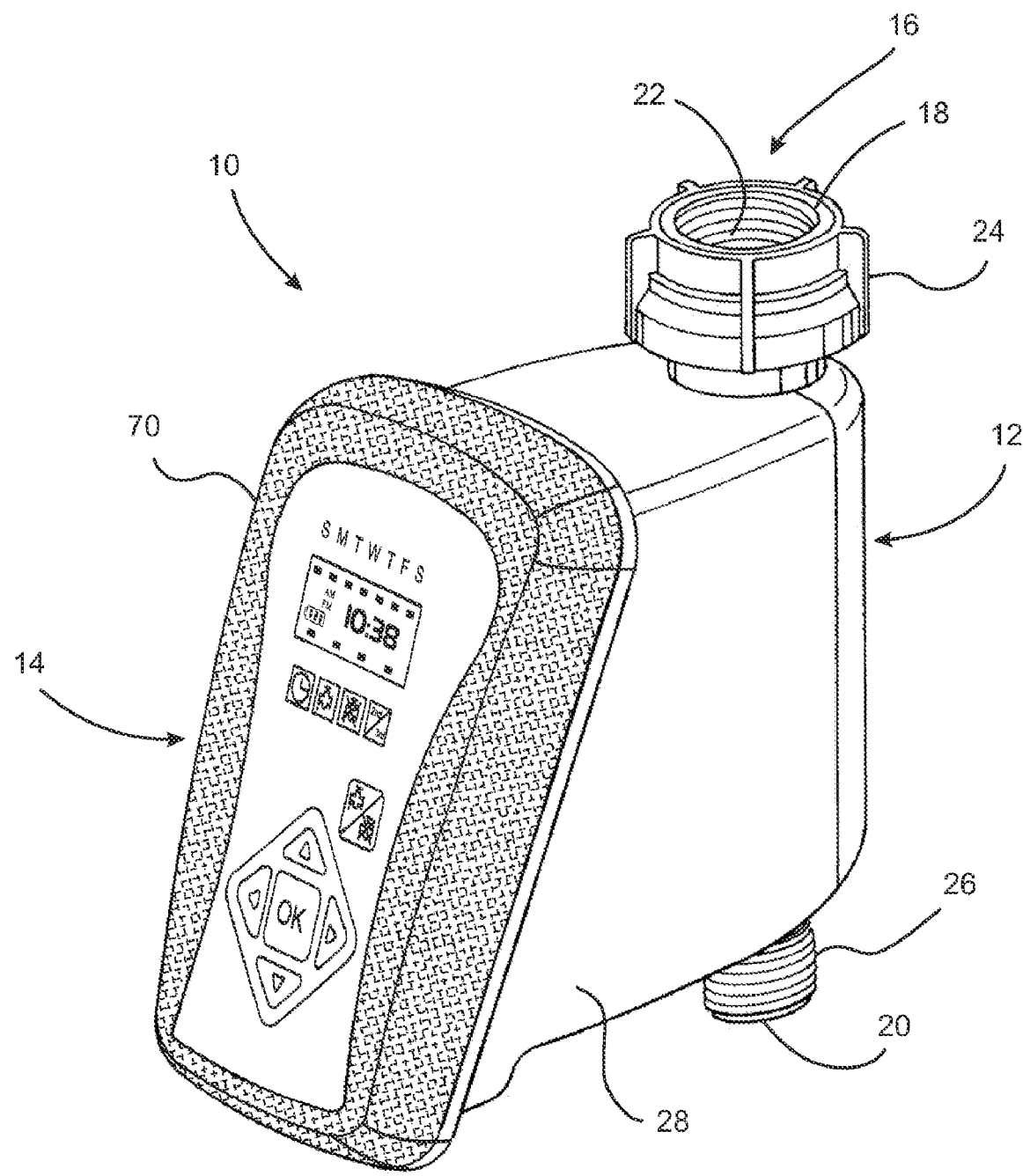
FIG. 1 is a perspective view of a water timer of the present disclosure.
Figure 2:
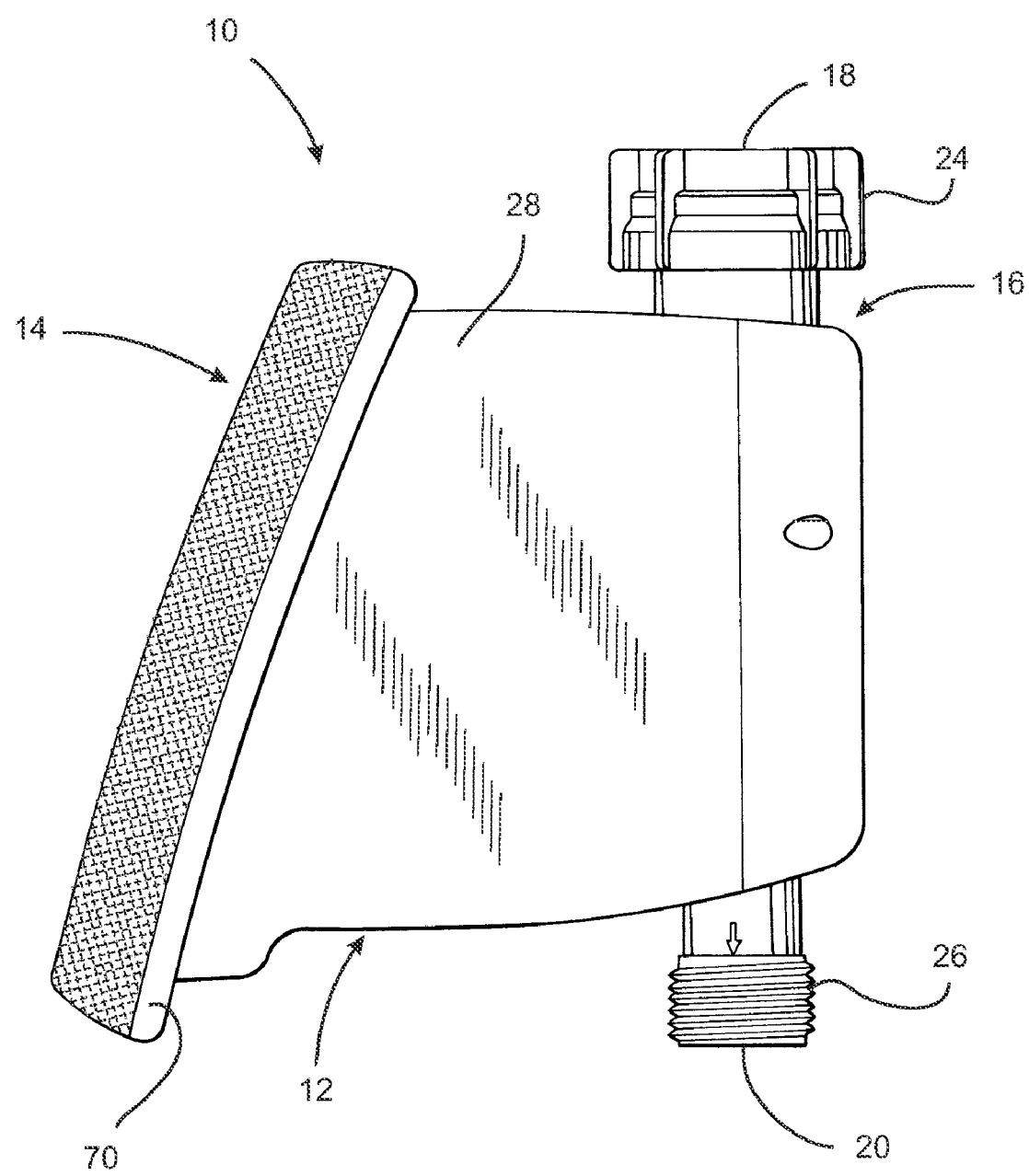
FIG. 2 is a left side elevational view of the water timer of FIG. 1.
Figure 3:
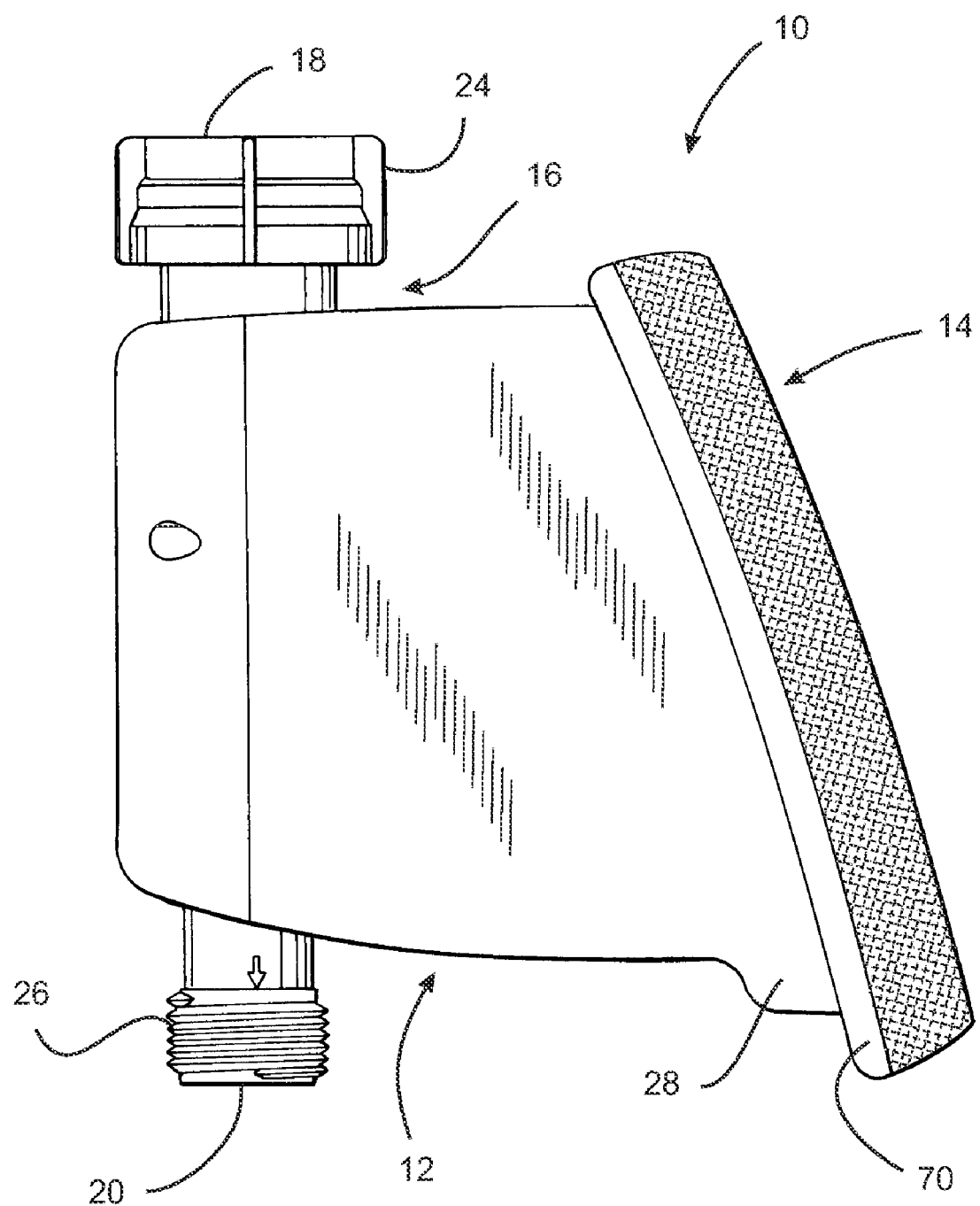
FIG. 3 is a right side elevational view of the water timer of FIG. 1.
Figure 4:
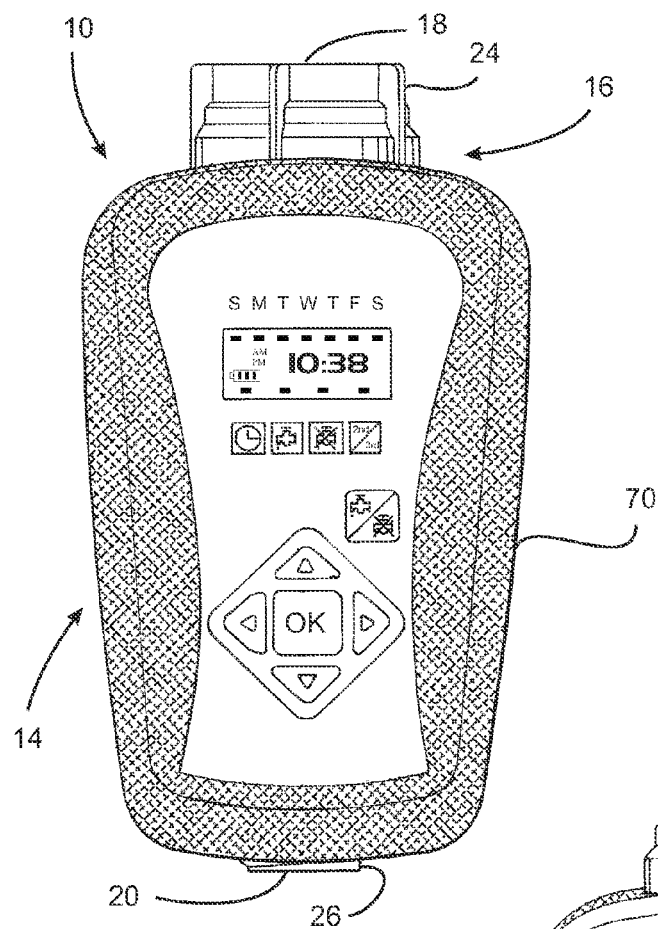
FIG. 4 is a front elevational view of the water timer of FIG. 1.
Figure 5:
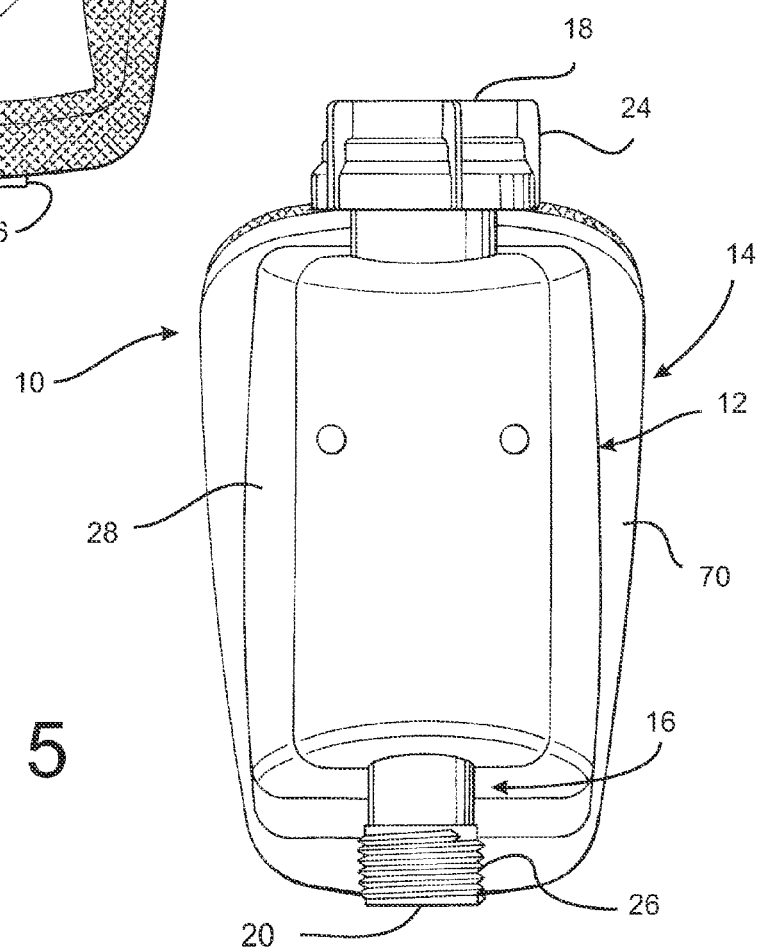
FIG. 5 is a rear elevational view of the water timer of FIG. 1.

While the water timer system herein is susceptible to various modifications and alternative forms, specific embodiments thereof have been shown by way of example in the drawings and will herein be described in detail. It should be understood, however, that there is no intent to limit the water timer system to the particular forms disclosed, but on the contrary, the intention is to cover all modifications, equivalents, and alternatives falling within the spirit and scope of the invention as defined by the appended claims.

Figure 8:
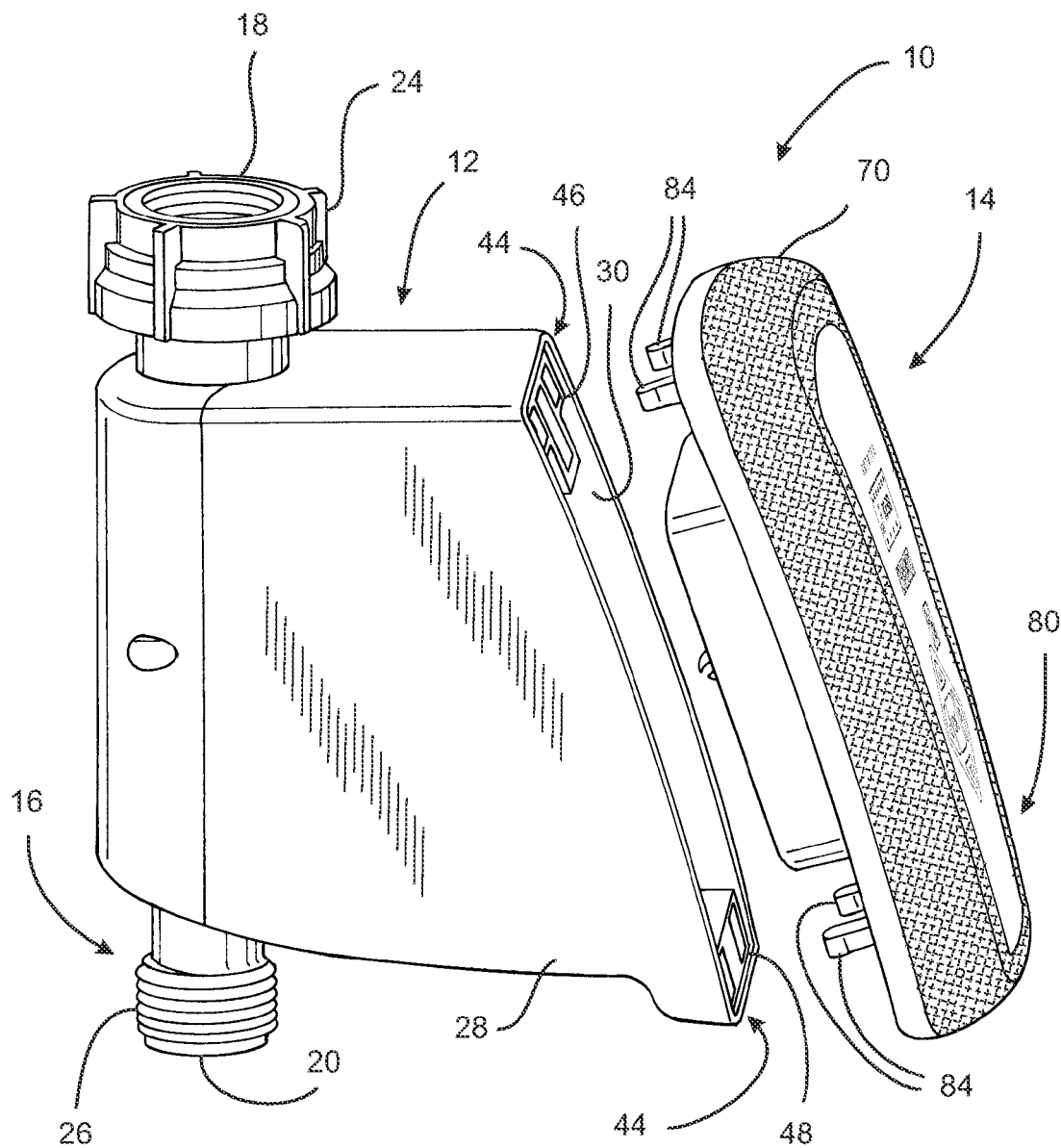
FIG. 8 is a perspective view of the water timer of FIG. 1 show in its decoupled state in which the input and display module is spaced apart from the base assembly.

Referring now to FIGS. 1-8, there is shown a water timer system 10 configured in accordance with the present disclosure. The water timer system 10 includes a base assembly 12 and an input and display module 14 that are removably coupled together. FIG. 8 shows the input and display module 14 decoupled from base assembly 14.

The base assembly 12 includes a conduit structure 16 that defines an inlet 18, an outlet 20, and a passage 22 extending therebetween. For example, water that advances into the inlet 18 is directed through the passage 22, and then out the outlet 20. The conduit structure 16 further includes an internally threaded female coupling 24 that defines the inlet 18, and an externally threaded male coupling 26 that defines the outlet 20.

Figure 9:
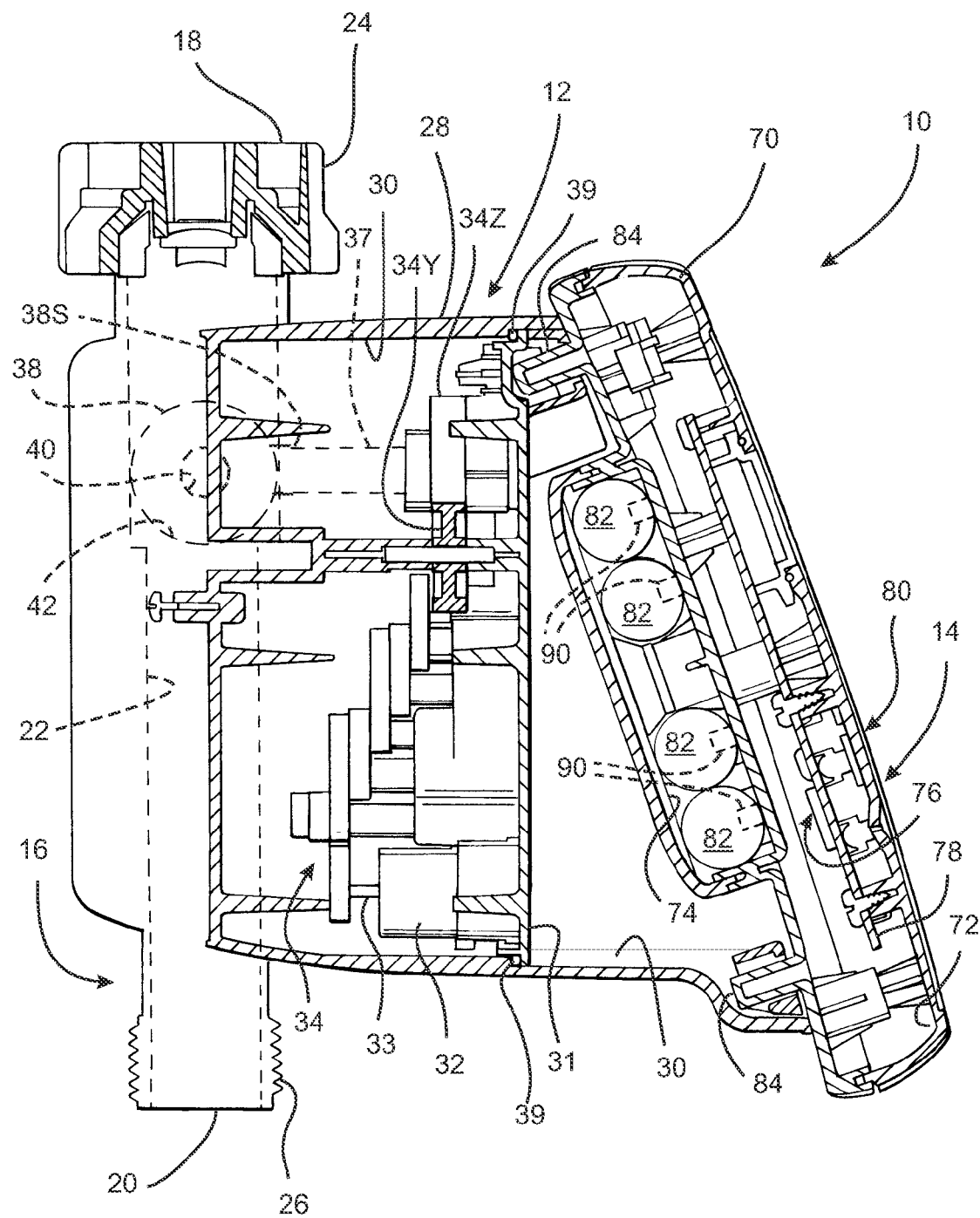
FIG. 9 is a cross sectional view of the water timer of FIG. 1.
Figure 10:
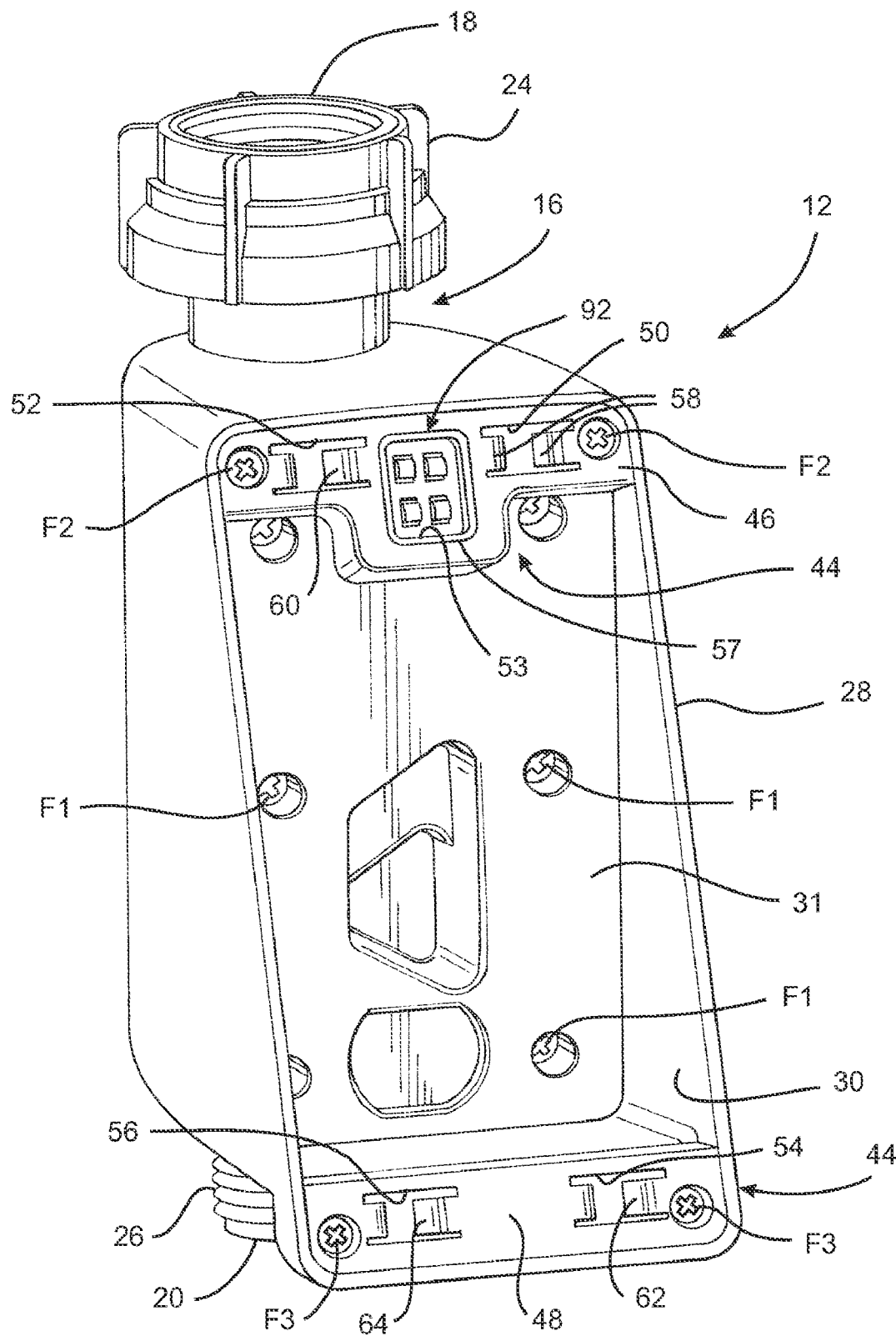
FIG. 10 is a perspective view of the base assembly of the water timer of FIG. 1.

The base assembly 12 further includes a housing 28 that defines a chamber 30 (see FIGS. 8 and 9). The base assembly 12 also includes a partition structure 31, a motor 32 and a gear set 34 each located within the chamber 30 as shown in FIG. 9. (See also FIG. 11.) The partition structure 31 is secured to the housing 28 by fasteners F1 as shown in FIG. 10. A seal 39 is interposed between the partition structure 31 and the housing 28 so as to form a fluid tight interface therebetween. (See FIGS. 9 and 11.) The motor 32 and gear set 34 are supported by the partition structure 31 so that rotation of an output shaft 33 of the motor 32 causes the gear set 34 to move. Note that the individual gears of the gear set 34 is respectively supported on shafts 35 that are fixed to the partition structure 31, with one exception. This exception is that one of the gears (i.e. first gear 34A) is supported on the drive shaft of the motor 32.

Figure 6:
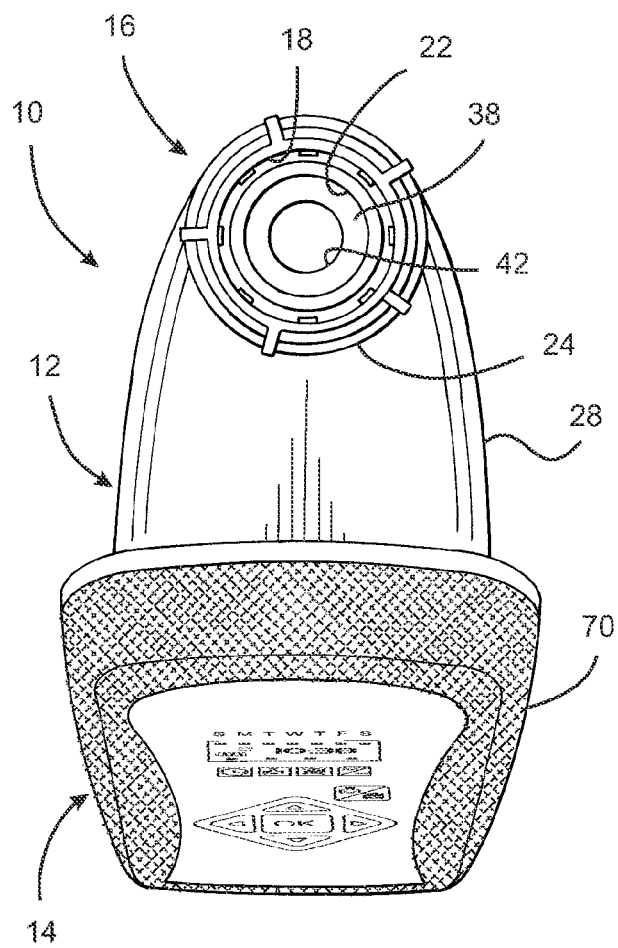
FIG. 6 is a top elevational view of the water timer of FIG. 1.
Figure 7:
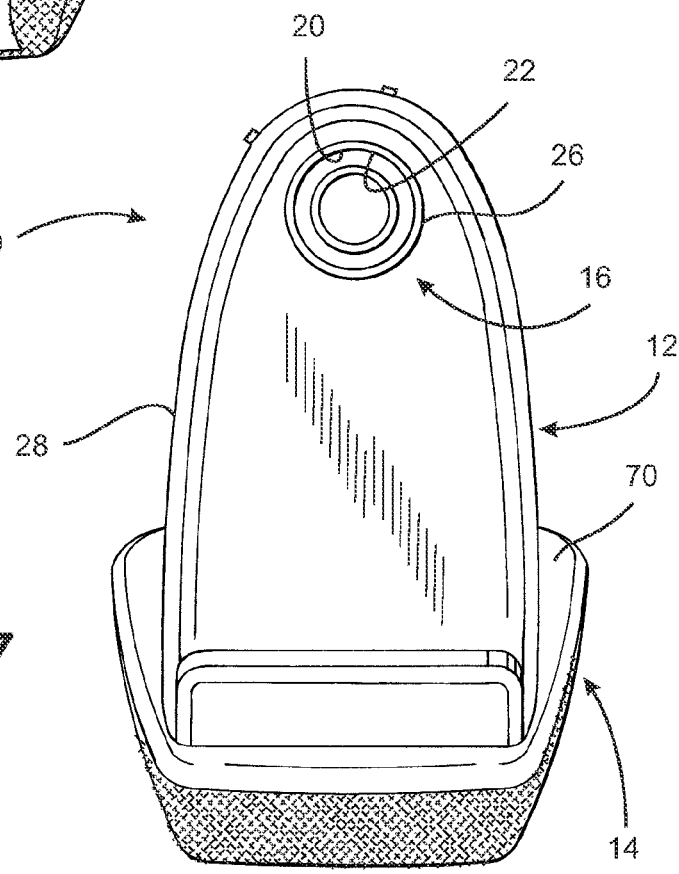
FIG. 7 is a bottom elevational view of the water timer of FIG. 1.

The base assembly 12 additionally includes a valve member 38 positioned in the passage 22 of the conduit structure 16 as shown in FIG. 9. The valve member 38 is ball-shaped and has a channel 40 defined therein. The conduit structure 16 defines a concave valve seat 42 that is shaped complementary to the valve member 38 so that when the valve member 38 is oriented to position the channel 40 perpendicular to the passage 22 as shown in FIG. 9, no fluid is allowed to advance through the passage 22. This position is herein referred to as the "closed position" of the valve member 38. However, when the valve member 38 is oriented to position the channel 40 in axial alignment with the passage 22 as shown in FIG. 6, fluid entering the inlet 18 is allowed to advance through the passage 22 and out of the outlet 20. This position is herein referred to as the "open position" of the valve member 38.

It should be appreciated that the last gear 34Z of the gear set 34 (see FIG. 9) includes a shaft 37 that is coupled to a shaft 38S of the valve member 38 whereby rotation of the shaft 37 causes rotation of the valve member 38. (Note that the last gear 34Z is removed from FIG. 11 for clarity of viewing.) The last gear 34Z is meshingly engaged to the second to last gear 34Y. (See FIGS. 9 and 11.) It should also be appreciated that rotation of the first gear 34A by the motor 32 causes rotation of the last gear 34Z which thereby causes rotation of shaft 37. Thus, movement of the gear set 34 causes the valve member 38 to rotate from the open position of the valve member 38 to the closed position of the valve member 38. Thereafter, further movement of the gear set 34 causes the valve member 38 to further rotate from the closed position of the valve member 38 to the open position of the valve member 38.

The base assembly 12 additionally includes receptacle structure 44 that includes a first support 46 and a second support 48 which are spaced apart from each other as shown in FIG. 10. The first support 46 is secured to the partition structure 31 by fasteners F2, while the second support 48 is secured to the housing by fasteners F3. Both the first support 46 and the second support 48 are located with the chamber 30 of the housing 28. Thus, the receptacle structure 44 is located within the chamber 30. The first support 46 defines an aperture 50 and an aperture 52. The apertures 50, 52 are spaced apart from each other as shown in FIG. 10. The first support 46 further includes a central aperture 53 located between the two apertures 50, 52. A seal 57 is positioned around the central aperture 53 and interposed between the first support 46 and the partition 31. The second support 48 defines an aperture 54 and an aperture 56. The apertures 54, 56 are spaced apart from each other as shown in FIG. 10. The first support 46 includes a pair of spring arms 58 located within the aperture 50, and another pair of spring arms 60 located within the aperture 52. Similarly, the second support 48 also includes a pair of spring arms 62 located within the aperture 54, and another pair of spring arms 64 located within the aperture 56. Since both the first support 46 and the second support 48 are located within the chamber 30 of the housing 28, all of the apertures 50, 52, 54, and 56 are located within the chamber 30 of the housing 28.

Figure 13:
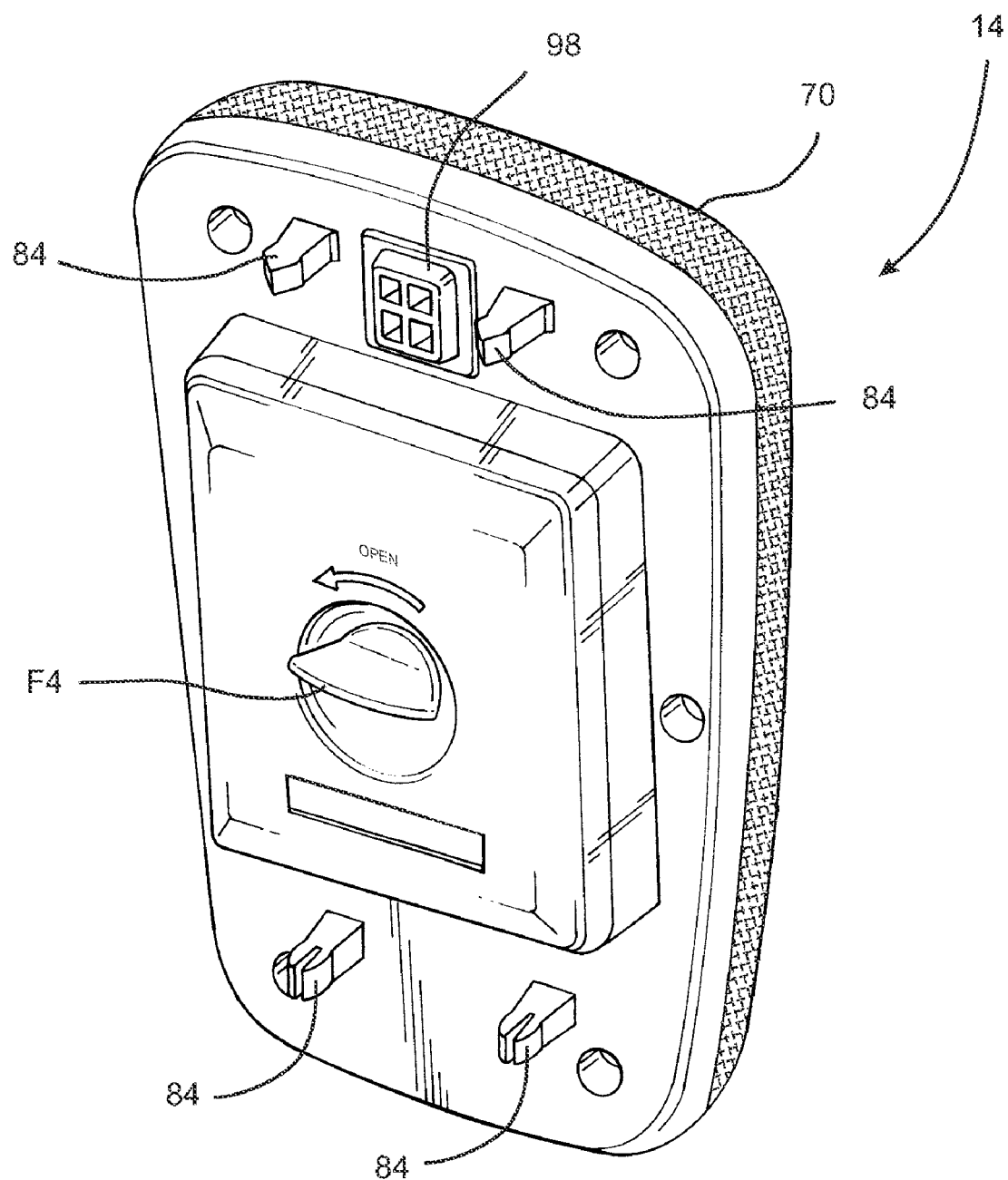
FIG. 13 is a perspective view of the rear side of the input and display module of the water timer system of FIG. 1.

The input and display module 14 is shown in detail in FIGS. 8, 9, and 13. The input and display module 14 includes a housing 70 that defines a chamber 72 and a chamber 74 as shown in FIG. 9. The input and display module 14 includes timer circuitry 76 located within the chamber 72. The timer circuitry 76 is supported on a printed circuit board 78 also located within the chamber 72. The input and display module 14 also includes an input and display device 80. The input and display device 80 is electrically coupled to the timer circuitry 76. The input and display device 80 is configured to provide input signals to the timer circuitry 76 in response to user actuation. The input and display device 80 is also configured to display indicia relating to an operating state of the water timer system 10. The input and display device 80 and the timer circuitry 76 are configured to (i) receive user inputs by which watering operation of the water timer system 10 is programmed, and (ii) to display the programmed settings of the watering operations. The input and display device 80 and the timer circuitry 76 allow a user to program a particular time period during which the water timer system 10 will allow water to advance through it based on parameters such as time of day and day of week. For example, a user may program the water timer system 10 via the input and display device 80 to cause water timer system 10 to operate to allow water to advance through it during the time period 2:00 a.m. to 3:00 a.m. every Monday, Wednesday, and Friday, the rest of the time the water timer system prevents water flow through it. Such programmed times (time of day and day of week) are then displayed on the input and display device 80. Input and display devices and timer circuitry that are utilized for water timer systems are well known in the art and need not be discussed in detail.

The input and display module 14 further includes a number of batteries 82 located in the chamber 74 as schematically shown in FIG. 9. Preferably, four AA batteries 82 are located in the chamber 74. When the batteries 82 are located within the chamber 74, they are electrically coupled to the timer circuitry 76 and the input and display device 80 to power these components.

FIGS. 1-7 and 9 show the input and display module 14 supported by the base assembly 12. FIG. 8 shows the input and display module 14 spaced apart from the base assembly 12. The input and display module 14 also includes a number of projections or posts 84 extending from the housing 70 as shown in FIG. 13. The projections 84 are respectively received within the apertures 50, 52, 54, and 56 of the receptacle structure 44 to couple the input and display module 14 to the base assembly 12. However, when the input and display module 14 is decoupled from the base assembly 12 as shown in FIG. 8, all of the projections are spaced apart from all of the apertures 50, 52, 54, and 56. Note that when the input and display module 14 is coupled to the base 12, all of the projections 84 are spaced apart from the housing 28 of the base assembly 12. (See, e.g., FIG. 9.) Similarly, when the input and display module 14 is decoupled from the base 12 as shown in FIG. 8, all of the projections 84 are located within the housing 28 of the base assembly 12.

The housing 70 further includes a battery chamber lid 86 that, along with other structure of the housing 70, defines the battery chamber or chamber 74. The lid 86 is removably secured to the rest of the structure of the housing 70 via a fastener F4. The input and display module 14 further includes electrical terminals 90 located within the chamber 74 as schematically shown in FIG. 9. The electrical terminals 90 are electrically coupled to the timer circuitry 76 and the input and display device 80. The electrical terminals 90 are also electrically coupled to the batteries 82 when the batteries 82 are located within the chamber 74 as shown in FIG. 9. As shown in FIG. 13, the battery chamber 74 is interposed between the upper projections 84 and the lower projections 84.

Figure 11:
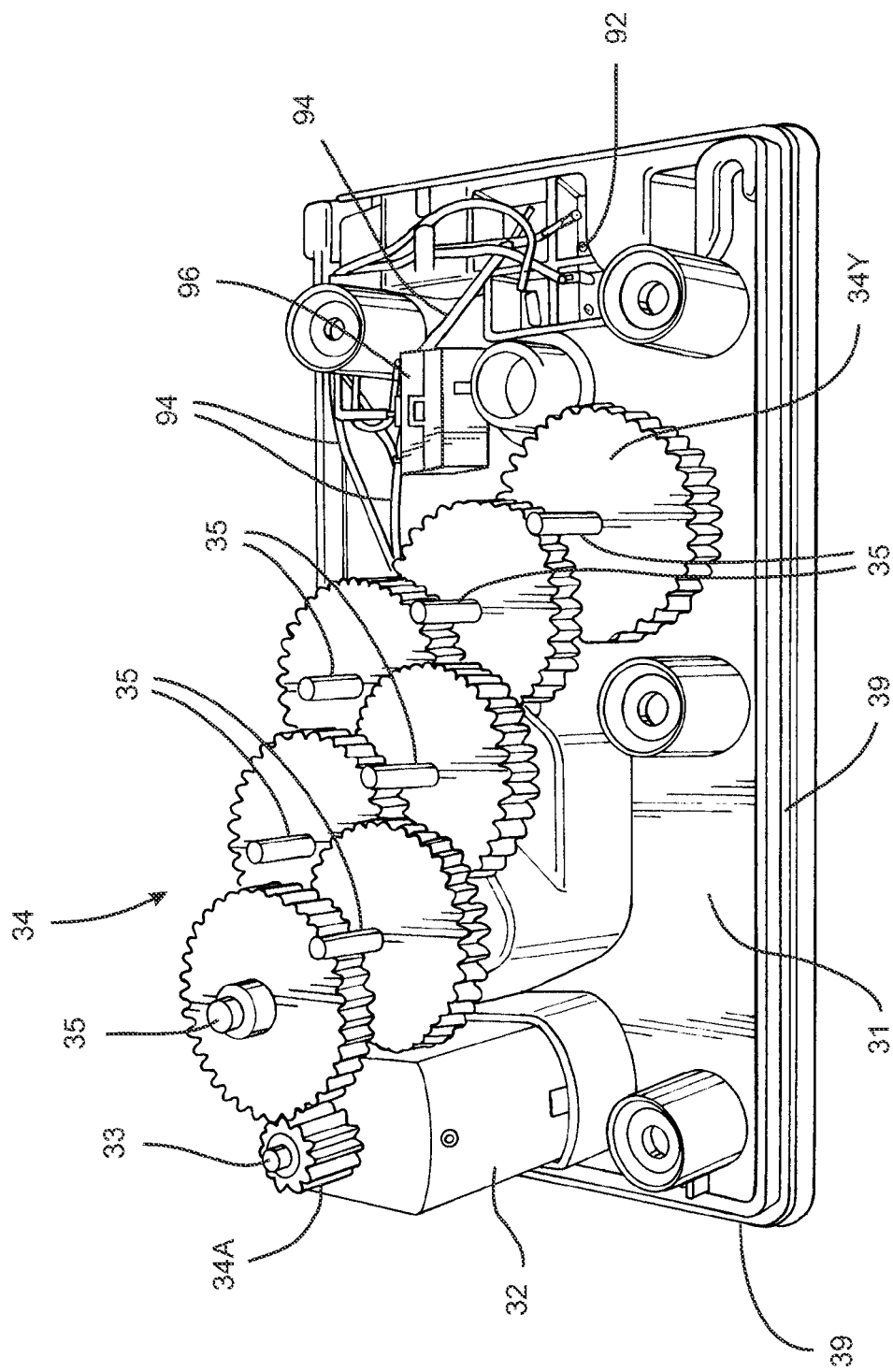
FIG. 11 is a perspective view of the rear side of the partition structure after being separated from the housing of the base assembly of the water timer system of FIG. 10, and showing the motor and various gears of the gear set.
Figure 12:
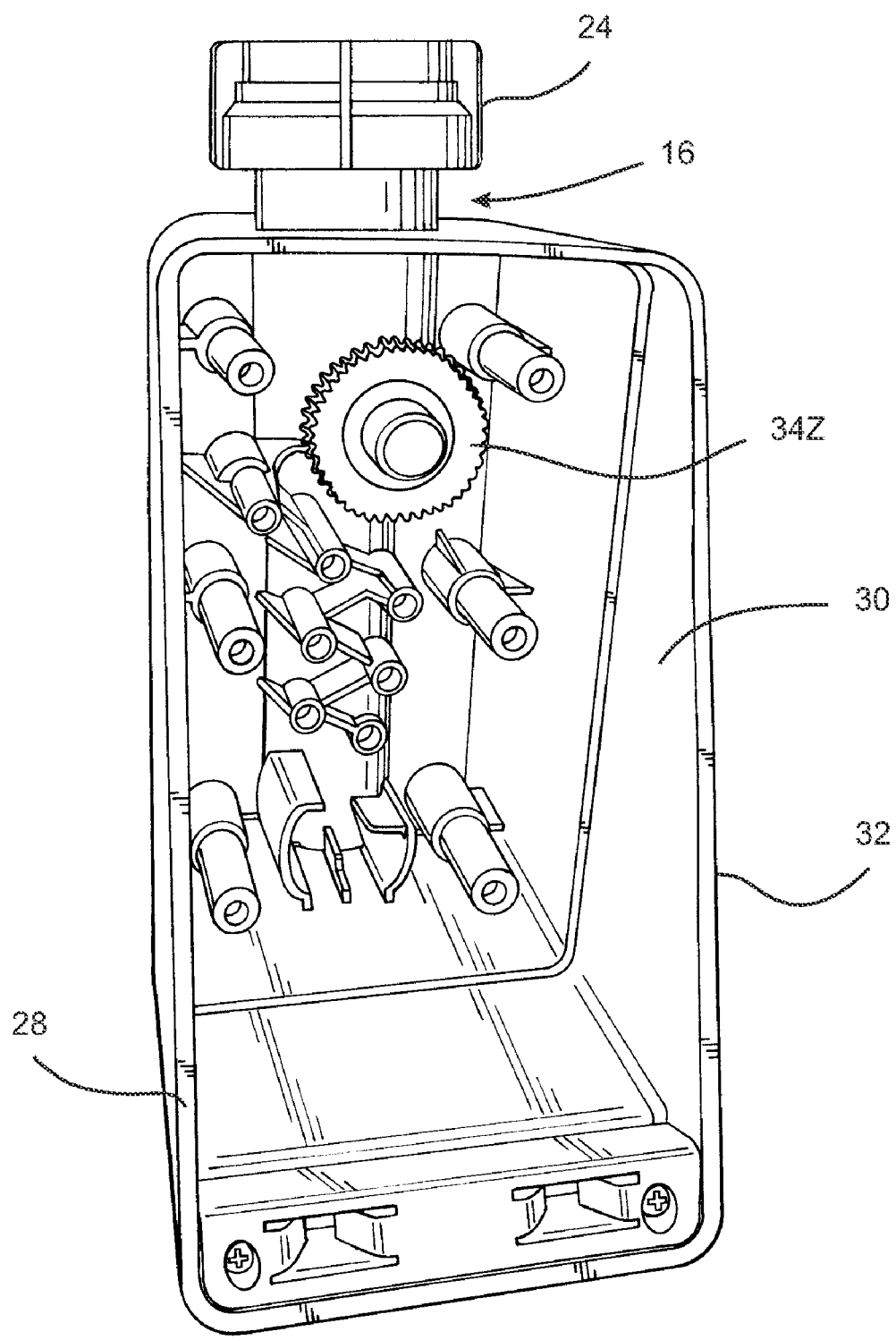
FIG. 12 is a perspective view of the housing of the base assembly of FIG. 10, and showing its chamber.

The base assembly 12 further includes an electrical coupling 92 that is located within the chamber 30 of the housing 28 as shown in FIG. 10. (See also FIG. 11.) The electrical coupling 92 is connected to electrical wires 94 as shown in FIG. 11. The electrical wires 94 are connected to both a switch 96 and the motor 32. The input and display module 14 further includes another electrical coupling 98 as shown in FIG. 13. When the input and display module 14 is coupled to the base assembly 12 as shown in FIGS. 1-7 and 9, the electrical coupling 98 is electrically connected to the electrical coupling 92 so that the batteries 82 supply power to the motor 32 so as to cause the output shaft 33 to rotate when appropriate according to the programmed settings of the input and display module 14. When the input and display module 14 is spaced apart from the base assembly 12 as shown in FIG. 8, the electrical coupling 98 is spaced apart from to the electrical coupling 92 so that the batteries 82 is electrically isolated from the motor 32 irrespective of the programmed settings of the input and display module 14. As shown in FIG. 13, the electrical coupling 98 is interposed between the upper left projection 84 and the upper right projection 84.

Note that when the input and display module 14 is coupled to the base 12, the battery chamber 74 is at least partially located within the chamber 30 of the housing 28 of the base assembly 12 as shown in FIG. 9. Thus, when the input and display module 14 is coupled to the base 12, the batteries 82 are at least partially located within the chamber 30 of the housing 28 of the base assembly 12 as shown in FIG. 9. Also note that when the input and display module 14 is decoupled from the base 12, the battery chamber 74 is spaced apart from the chamber 30 of the housing 28 of the base assembly 12. (See, e.g., FIG. 8.). Thus, when the input and display module 14 is decoupled to the base 12 (and the batteries 82 are located within the battery chamber 74), the batteries 82 are spaced apart from the chamber 30 of the housing 28 of the base assembly 12 as shown in FIG. 8.

Further note that when the input and display module 14 is coupled to the base assembly 12, the projections 84 are respectively received within the apertures 50, 52, 54, and 56 so that each projection 84 is in contact with both spring arms of each pair of spring arms 58, 60, 62, 64. For example, when the module 14 is coupled to the base assembly 12, the upper left projection 84 (as shown in FIG. 13) is positioned in contact with both spring arms of the pair of spring arms 58 of the aperture 50.

Figure 14:
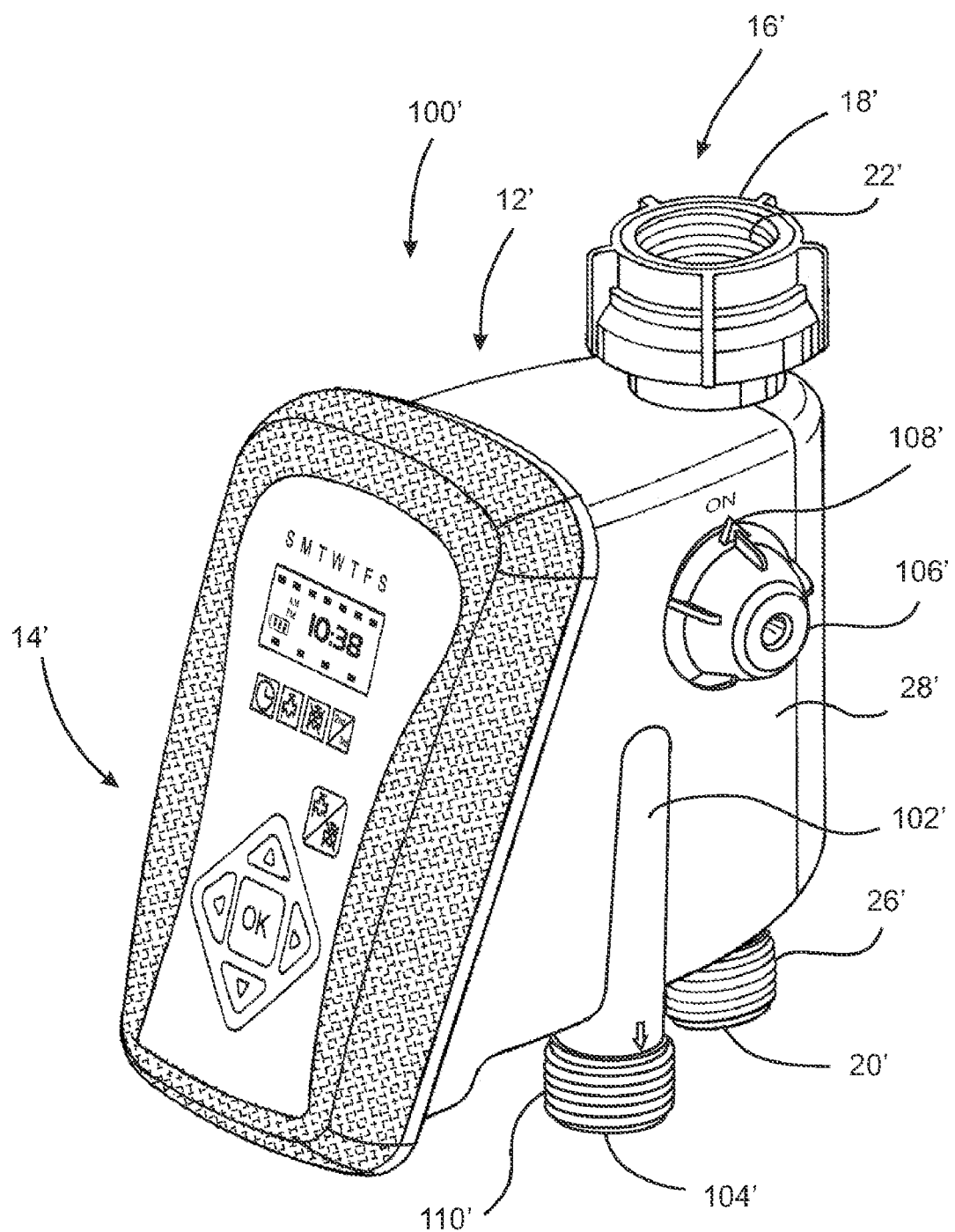
FIG. 14 is a perspective view of an alternative embodiment of a water timer system of the present disclosure.
Figure 15:
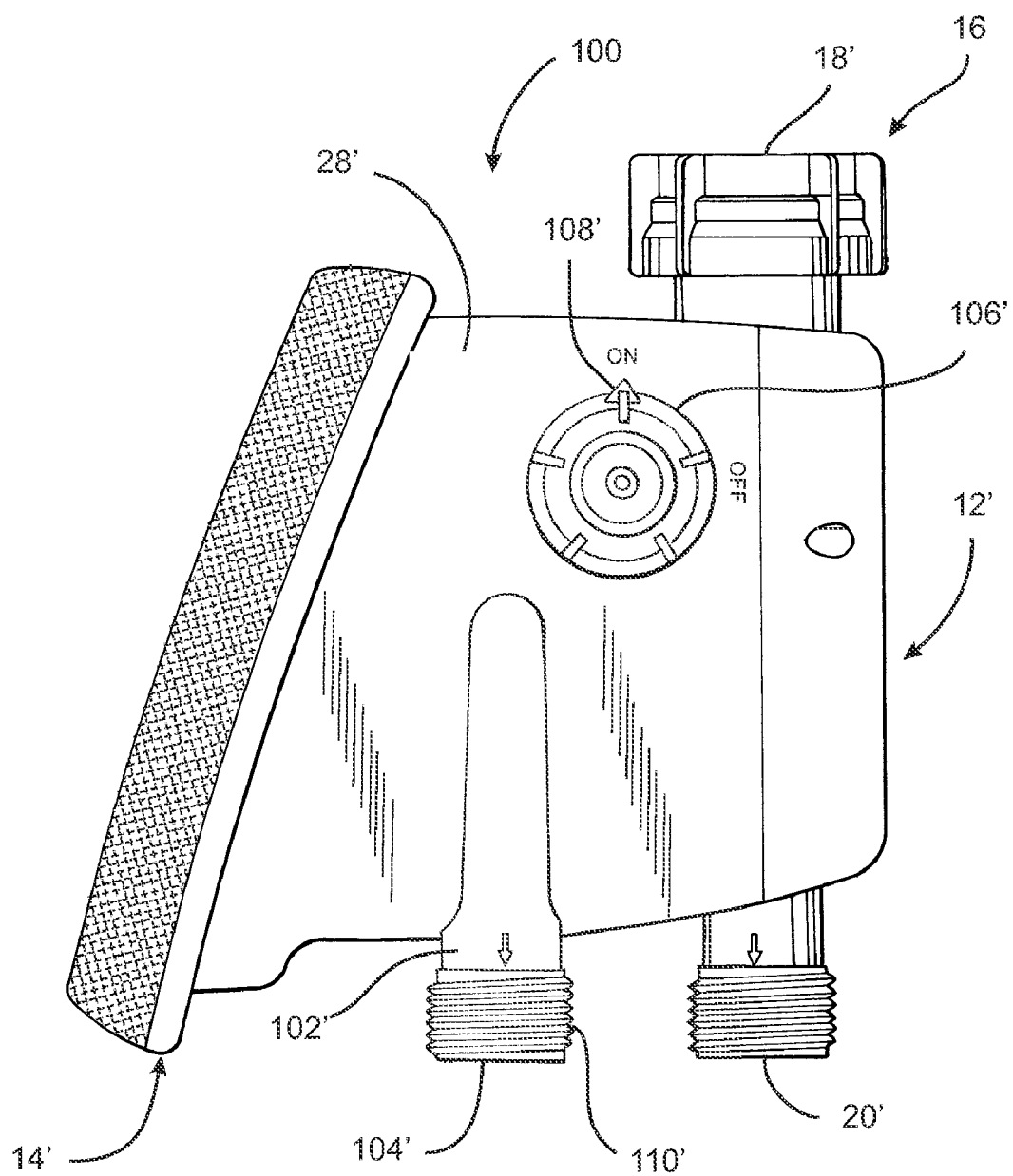
FIG. 15 is a left side elevational view of the water timer of FIG. 14.

Turning now to FIGS. 14 and 15, there is shown another embodiment of a water timer system 100 that incorporates the features of the present disclosure therein. The water timer system 100 is similar in construction and operation to the water timer system 10, with some exceptions. Thus, the reference numbers used to describe the water timer system 10 will be used to describe the water timer system 100 with the addition of a prime symbol ('). For example, the base assembly and the input and display module of the water timer system 10 was identified by reference numbers 12 and 14, respectively, and therefore the base assembly and the input and display module of the water timer system 100 will be identified by the reference numbers 12' and 14'.

One exception between the water timer systems 10 and 100 is that the water timer system 100 is a dual output system. In particular, the water timer system 100 includes a bypass conduit structure 102' that communicates with the passage 22' so that water entering the inlet 18' may advance through a passage (not shown) of the bypass conduit structure 102' and exit out of an outlet 104'. A valve member (not shown) is located in the passage of the bypass conduit structure 102' and is manually actuated by rotation of an actuator 106'. The actuator 106' is movable between an "off" position in which a pointer 108' of the actuator 106' is aligned with the indicia "OFF" formed on the housing 28', and an "on" position in which the pointer 108' is aligned with the indicia "ON" formed on the housing 28'. Note that in FIGS. 14-15, the actuator 106' is located in the "on" position. When the actuator 106' is located in the "on" position, the valve member is positioned to allow water to flow through the bypass conduit structure 102'. In contrast, when the actuator 106' is located in the "off" position, the valve member is positioned to block or otherwise prevent water from flowing through the bypass conduit structure 102'. The outlet 104' includes an externally threaded coupling 110' to which an internally threaded coupling of a flexible hose may be connected. The above-described bypass function of the water timer system 100 is useful when a user desires to perform a watering operation during a time period in which the other valve member (similar to valve member 38 of water timer system 10) that is positioned in the other conduit structure 16' is located in its "closed position".

Another exception between the water timer systems 10 and 100 relates to differences between the input and display module 14, 14'. As can be seen from FIGS. 1 and 14, the configuration of the user interfaces of the modules 14, 14' are distinguishable from each other. Still another exception between the water timer systems 10, 100 relate to the location and configuration of the electrical couplings of the base assemblies 12, 12' and the input and display module 14, 14' (see, e.g., electrical couplings 92, 98 of water timer system 10). In particular, the electrical couplings of the water timer system 100 may be located at a position lower and more laterally in comparison to the position of the electrical couplings of the water timer system 10. Other distinctions between the water timer systems 10 and 100 relate to the configuration and location of the components positioned within the chambers of the housing of the base assemblies 12, 12' such as the mechanical linkages and electrical components that cause energy to be transmitted from the batteries (see, e.g., batteries 82) to the valve members (see, e.g., valve member 38).

There is a plurality of advantages arising from the various features of each of the embodiments of the water timer system described herein. It will be noted that alternative embodiments of the water timer system may not include all of the features described yet still benefit from at least some of the advantages of such features. Those of ordinary skill in the art may readily devise their own implementations of the water timer system that incorporate one or more of the features and fall within the spirit and scope of the present invention as defined by the appended claims.

What is claimed is:

1. A water timer system, comprising:
a base assembly including (i) a conduit structure defining an inlet, an outlet, and a passage extending between said inlet and said outlet, (ii) a first housing defining a first chamber, (iii) a motor located within said first chamber and having an output member, (iv) a gear set located within said first chamber, wherein movement of said output member causes movement of said gear set, (v) a valve member movable between a first valve position in which said valve member is positioned to prevent water flow through said passage and a second valve position in which said valve member is positioned to enable water flow through said passage, wherein movement of said gear set causes said valve member to move between said first valve position and said second valve position, (vi) receptacle structure defining a first aperture and a second aperture; and an input and display module including (i) a second housing defining a second chamber and a third chamber, (ii) timer circuitry located within said second chamber, (iii) an input and display device configured to provide input signals to said timer circuitry in response to user actuation and to display indicia relating to an operating state of the water timer system, (iv) electrical terminals located in said third chamber and electrically connected to said timer circuitry, (v) a first projection extending from said second housing and configured to be received within said first aperture of said receptacle structure, and (vi) a second projection extending from said second housing and configured to be received within said second aperture of said receptacle structure, wherein said third chamber is at least partially positioned between said first projection and said second projection, wherein said input and display module is positionable in relation to said base assembly between (i) a first module position in which said input and display module is supported by said base assembly, and (ii) a second module position in which said input and display module is spaced apart from said base assembly, wherein, when said input and display module is positioned in said first module position, (i) said first projection of said input and display module is received within said first aperture of said receptacle structure, and (ii) said second projection of said input and display module is received within said second aperture of said receptacle structure, and wherein, when said input and display module is positioned in said second module position, (i) said first projection of said input and display module is spaced apart from said first aperture of said receptacle structure, and (ii) said second projection of said input and display module is spaced apart from said second aperture of said receptacle structure.

2. The water timer system of claim 1, further comprising at least one battery located in said third chamber and contacting said electrical terminals, wherein:

said at least one battery is configured to supply power to said timer circuitry, said base assembly further includes a first electrical coupling, said input and display module includes a second electrical coupling, when said input and display module is positioned in said first module position, said second electrical coupling is mated with said first electrical coupling so that said at least one battery supplies power to said motor so as to cause said output member to move, and when said input and display module is positioned in said second module position, said second electrical coupling is spaced apart from said first electrical coupling so that said at least one battery is electrically isolated from said motor.

3. The water timer system of claim 2, wherein said first electrical coupling is located within said first chamber.

4. The water timer system of claim 3, wherein said first aperture and said second aperture are also located within said first chamber.

5. The water timer system of claim 1, wherein:

when said input and display module is positioned in said first module position, said third chamber is at least partially positioned within said first chamber, and when said input and display module is positioned in said second module position, said third chamber is spaced apart from said first chamber.

6. The water timer system of claim 1, wherein:

said receptacle structure includes (i) a first support defining said first aperture, (ii) a first spring arm located in said first aperture, and (iii) a second spring arm located in said first aperture and spaced apart from said first spring arm, said receptacle structure further includes (i) a second support spaced apart from said first support and defining said second aperture, (ii) a third spring arm located in said second aperture, and (iii) a fourth spring arm located in said second aperture and spaced apart from said third spring arm, and when said input and display module is positioned in said first module position, (i) said first projection is positioned in contact with both said first spring arm and said second spring arm, and (ii) said second projection is positioned in contact with both said third spring arm and said fourth spring arm.

7. The water timer system of claim 6, wherein said receptacle structure is located within said first chamber.

8. The water timer system of claim 1, wherein:

said receptacle structure further defines a third aperture and a fourth aperture, said input and display module further includes (i) a third projection extending from said second housing and configured to be received within said third aperture of said receptacle structure, (ii) a fourth projection extending from said second housing and configured to be received within said fourth aperture of said receptacle structure, and said third chamber is further at least partially positioned between said third projection and said fourth projection.

9. The water timer system of claim 2, wherein:

said receptacle structure further defines a third aperture and a fourth aperture, said input and display module further includes (i) a third projection extending from said second housing and configured to be received within said third aperture of said receptacle structure, (ii) a fourth projection extending from said second housing and configured to be received within said fourth aperture of said receptacle structure, and said second electrical coupling of said input and display module is interposed between said first projection and said third projection.

10. The water timer system of claim 6, wherein:

said receptacle structure further defines (i) a third aperture that is spaced apart from said first aperture, and (ii) a fourth aperture that is spaced apart from said second aperture, said input and display module further includes (i) a third projection extending from said second housing and configured to be received within said third aperture of said receptacle structure, and (ii) a fourth projection extending from said second housing and configured to be received within said fourth aperture of said receptacle structure, said first support structure further defines said third aperture, and
said second support structure further defines said fourth aperture.

11. A water timer system, comprising:
a base assembly including (i) a conduit structure defining an inlet, an outlet, and a passage extending between said inlet and said outlet, (ii) a first housing defining a first chamber, (iii) a motor located within said first chamber and having an output member, (iv) a valve member movable between a first valve position in which said valve member is positioned to prevent water flow through said passage and a second valve position in which said valve member is positioned to enable water flow through said passage, wherein movement of said motor causes said valve member to move between said first valve position and said second valve position, (v) one of a first aperture and a first projection, and (vi) one of a second aperture and a second projection; and
an input and display module including (i) a second housing defining a second chamber and a third chamber, (ii) timer circuitry located within said second chamber, (iii) an input and display device configured to provide input signals to said timer circuitry in response to user actuation and to display indicia relating to an operating state of the water timer system, (iv) electrical terminals located in said third chamber and electrically connected to said timer circuitry, (v) the other of said first aperture and said first projection, and (vi) the other of said second aperture and said second projection,
wherein said input and display module is positionable in relation to said base assembly between (i) a first module position in which said input and display module is supported by said base assembly, and (ii) a second module position in which said input and display module is spaced apart from said base assembly,
wherein, when said input and display module is positioned in said first module position, (i) said first projection is received within said first aperture, and (ii) said second projection is received within said second aperture,
wherein, when said input and display module is positioned in said second module position, (i) said first projection is spaced apart from said first aperture, and (ii) said second projection is spaced apart from said second aperture,
wherein, when said input and display module is positioned in said first module position, (i) said third chamber is at least partially positioned between said first projection and said second projection, and (ii) said third chamber is at least partially positioned within said first chamber, and
when said input and display module is positioned in said second module position, said third chamber is spaced apart from said first chamber.

12. The water timer system of claim 11, further comprising at least one battery located in said third chamber and contacting said electrical terminals, wherein:
said at least one battery is configured to supply power to said timer circuitry,
said base assembly further includes a first electrical coupling,
said input and display module includes a second electrical coupling,
when said input and display module is positioned in said first module position, said second electrical coupling is mated with said first electrical coupling so that said at least one battery supplies power to said motor so as to cause said output member to move, and when said input and display module is positioned in said second module position, said second electrical coupling is spaced apart from said first electrical coupling so that said at least one battery is electrically isolated from said motor.

13. The water timer system of claim 12, wherein:
said first electrical coupling is located within said first chamber, and
said first aperture and said second aperture are also located within said first chamber.

14. The water timer system of claim 11, further comprising a receptacle structure located within said first chamber, wherein:
said receptacle structure includes (i) a first support defining said first aperture, (ii) a first spring arm located in said first aperture, and (iii) a second spring arm located in said first aperture and spaced apart from said first spring arm,
said receptacle structure further includes (i) a second support spaced apart from said first support and defining said second aperture, (ii) a third spring arm located in said second aperture, and (iii) a fourth spring arm located in said second aperture and spaced apart from said third spring arm, and
when said input and display module is positioned in said first module position, (i) said first projection is positioned in contact with both said first spring arm and said second spring arm, and (ii) said second projection is positioned in contact with both said third spring arm and said fourth spring arm.

15. A water timer system, comprising:
a base assembly including (i) a conduit structure defining an inlet, an outlet, and a passage extending between said inlet and said outlet, (ii) a first housing defining a first chamber, (iii) a motor located within said first chamber and having an output member, (iv) a valve member movable between a first valve position in which said valve member is positioned to prevent water flow through said passage and a second valve position in which said valve member is positioned to enable water flow through said passage, wherein movement of said motor causes said valve member to move between said first valve position and said second valve position, (v) one of a first aperture and a first projection, and (vi) one of a second aperture and a second projection; and
an input and display module including (i) a second housing defining a second chamber and a third chamber, (ii) timer circuitry located within said second chamber, (iii) an input and display device configured to provide input signals to said timer circuitry in response to user actuation and to display indicia relating to an operating state of the water timer system, (iv) electrical terminals located in said third chamber and electrically connected to said timer circuitry, (v) the other of said first aperture and said first projection, (v) the other of said first aperture and said first projection, and (vi) the other of said second aperture and said second projection,
wherein said input and display module is positionable in relation to said base assembly between (i) a first module position in which said input and display module is supported by said base assembly, and (ii) a second module position in which said input and display module is spaced apart from said base assembly,
wherein, when said input and display module is positioned in said first module position, (i) said first projection is received within said first aperture, and (ii) said second projection is received within said second aperture, and wherein, when said input and display module is positioned in said second module position, (i) said first projection is spaced apart from said first aperture, and (ii) said second projection is spaced apart from said second aperture.

16. The water timer system of claim 15, wherein, when said input and display module is positioned in said first module position, said third chamber is at least partially positioned between said first projection and said second projection.

17. The water timer system of claim 15, further comprising at least one battery located in said third chamber and contacting said electrical terminals, wherein said at least one battery is configured to supply power to said timer circuitry.

18. The water timer system of claim 17, wherein:

said base assembly further includes a first electrical coupling, said input and display module includes a second electrical coupling, when said input and display module is positioned in said first module position, said second electrical coupling is mated with said first electrical coupling so that said at least one battery supplies power to said motor so as to cause said output member to move, and when said input and display module is positioned in said second module position, said second electrical coupling is spaced apart from said first electrical coupling so that said at least one battery is electrically isolated from said motor.

19. The water timer system of claim 18, wherein:

said first electrical coupling is located within said first chamber, and said first aperture and said second aperture are also located within said first chamber.

20. The water timer system of claim 15, wherein:

when said input and display module is positioned in said first module position, said third chamber is at least partially positioned within said first chamber, and when said input and display module is positioned in said second module position, said third chamber is spaced apart from said first chamber.

21. The water timer system of claim 15, wherein:

said receptacle structure includes (i) a first support defining said first aperture, (ii) a first spring arm located in said first aperture, and (iii) a second spring arm located in said first aperture and spaced apart from said first spring arm, said receptacle structure further includes (i) a second support spaced apart from said first support and defining said second aperture, (ii) a third spring arm located in said second aperture, and (iii) a fourth spring arm located in said second aperture and spaced apart from said third spring arm, when said input and display module is positioned in said first module position, (i) said first projection is positioned in contact with both said first spring arm and said second spring arm, and (ii) said second projection is positioned in contact with both said third spring arm and said fourth spring arm, and said receptacle structure is located within said first chamber.

* * * * *